United States Patent
Wagner

(10) Patent No.: US 9,729,606 B2
(45) Date of Patent: Aug. 8, 2017

(54) SYSTEMS AND METHODS FOR A METADATA DRIVEN USER INTERFACE FRAMEWORK

(71) Applicant: Benefitfocus.com, Inc., Charleston, SC (US)

(72) Inventor: Adam Wagner, Piedmont, SC (US)

(73) Assignee: Benefitfocus.com, Inc., Charleston, SC (US)

( * ) Notice: Subject to any disclaimer, the term of this patent is extended or adjusted under 35 U.S.C. 154(b) by 186 days.

(21) Appl. No.: 14/482,437

(22) Filed: Sep. 10, 2014

(65) Prior Publication Data

US 2016/0070680 A1 Mar. 10, 2016

(51) Int. Cl.
| | |
|---|---|
| *G06F 17/00* | (2006.01) |
| *H04L 29/08* | (2006.01) |
| *G06F 17/30* | (2006.01) |
| *G06F 3/00* | (2006.01) |
| *H04L 29/06* | (2006.01) |
| *G06F 9/44* | (2006.01) |

(52) U.S. Cl.
CPC .............. *H04L 67/02* (2013.01); *G06F 3/00* (2013.01); *G06F 9/44* (2013.01); *G06F 9/4443* (2013.01); *G06F 17/30861* (2013.01); *H04L 67/38* (2013.01)

(58) Field of Classification Search
CPC ................................. G06F 9/4443; G06F 8/38
USPC ....................................................... 715/760
See application file for complete search history.

(56) References Cited

U.S. PATENT DOCUMENTS

| | | | |
|---|---|---|---|
| 8,095,565 B2 | 1/2012 | Dengler et al. | |
| 9,026,905 B2* | 5/2015 | Tseng .................... | G06F 9/4443 715/234 |
| 2005/0138631 A1* | 6/2005 | Bellotti ................. | G06Q 10/06 719/310 |
| 2006/0010011 A1* | 1/2006 | Ullom .................... | G06Q 50/22 705/2 |

(Continued)

FOREIGN PATENT DOCUMENTS

WO 2012012778 A1 1/2012

OTHER PUBLICATIONS

International Search Report and Written Opinion for Application No. PCT/US2015/047882 filed Sep. 1, 2015, and mailed from the International Searching Authority on Dec. 15, 2015, 11 pgs.

(Continued)

*Primary Examiner* — Mohammed-Ibrahim Zuberi
(74) *Attorney, Agent, or Firm* — John R. Thompson; Stoel Rives LLP

(57) ABSTRACT

A method and system for providing a metadata driven user interface for a web application are disclosed. A system includes a host component, a metadata interpreter, a rendering engine, and a response component. The host component is configured to receive, from a client, a request for at least a portion of a web application. The metadata interpreter is configured to retrieve metadata describing a user interface of the web application. The rendering engine is configured to render an initial screen based on the metadata. The initial screen is for display by the client in relation to an activity of the web application. The response component is configured to send the metadata and the initial screen to the client.

20 Claims, 6 Drawing Sheets

(56) References Cited

U.S. PATENT DOCUMENTS

| | | | |
|---|---|---|---|
| 2007/0074121 A1* | 3/2007 | Mullender | G06F 17/3056 |
| | | | 715/744 |
| 2007/0150820 A1 | 6/2007 | Salvo | |
| 2007/0208751 A1* | 9/2007 | Cowan | G06Q 30/02 |
| 2008/0120557 A1 | 5/2008 | Offenhartz et al. | |
| 2009/0164516 A1* | 6/2009 | Svendsen | G06F 17/30041 |
| 2010/0138491 A1* | 6/2010 | Churchill | G06Q 50/00 |
| | | | 709/204 |
| 2010/0153175 A1* | 6/2010 | Pearson | G06Q 10/10 |
| | | | 705/319 |
| 2012/0078677 A1 | 3/2012 | Green et al. | |
| 2014/0096014 A1 | 4/2014 | Johnson et al. | |
| 2015/0121193 A1* | 4/2015 | Beveridge | G06F 17/30893 |
| | | | 715/234 |

OTHER PUBLICATIONS

Guilieri, Olivier, "Minimalist Meta-Model for CRUD Applications," http://www.codeproject.com/Articles/28636/Minimalist-Meta-Model-for-CRUD-Applications, Dec. 28, 2011, printed Sep. 23, 2014, 17 pgs.
Meteor Preview 0.9.2.2, "A better way to build apps.," https://www.meteor.com/, printed Sep. 23, 2014, 2 pgs.
"A JavaScript library for building user interfaces/React," http://facebook.github.io/react/, printed Sep. 23, 2014, 3 pgs.
"Metawidget," http://metawidget.org/, printed Sep. 23, 2014, 2 pgs.
Notice of Allowance and Fee(s) Due for U.S. Appl. No. 14/463,314, filed Aug. 19, 2014, and mailed from the USPTO on May 22, 2017, 15 pgs.

* cited by examiner

SYSTEMS AND METHODS FOR A METADATA DRIVEN USER INTERFACE FRAMEWORK

TECHNICAL FIELD

This application relates to systems and methods for creating web application user interfaces (UIs) with metadata.

DETAILED DESCRIPTION OF PREFERRED EMBODIMENTS

Figure 1:
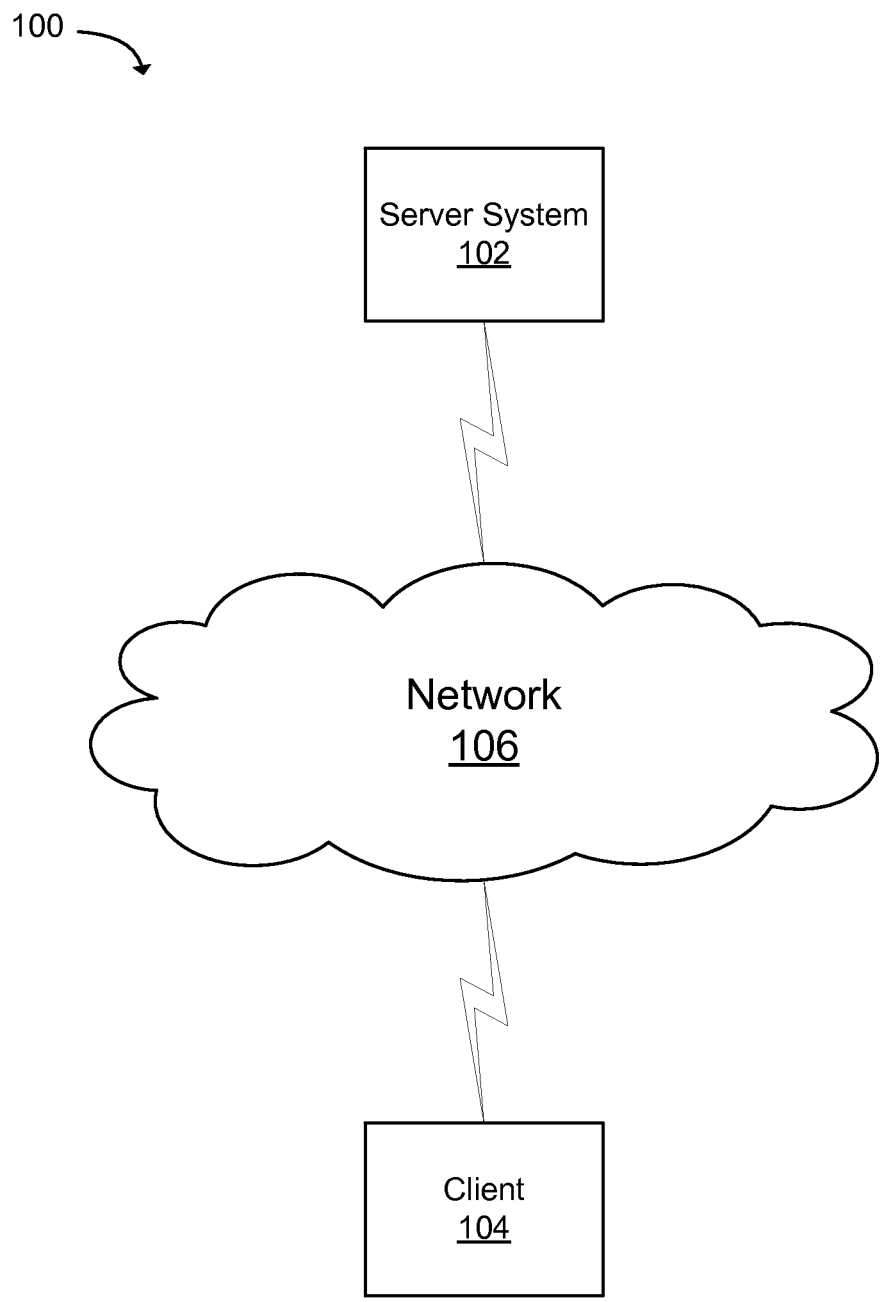
FIG. 1 is a block diagram of a system for providing a metadata driven UI, according to one embodiment.

Web applications allow software to be hosted on a server and accessed and run on a client device. For example, web applications generally include software that can be run in a web browser. Web applications are particularly helpful when distributing and installing software on any potential client devices becomes difficult or burdensome. For example, the web application may be maintained and updated at a single location (e.g., a server) such that any client with a browser can access and use the web application.

Traditional web application user interfaces (UIs) are static in the sense that they can only be changed by developers who have access to the web application source code or files. For example, the developers are required to hard-code the web application UI. In some cases, different tenants (e.g., different business entities or clients) may desire unique UIs including UI navigation, groupings of procedures or processes, and the like. In order to provide a unique UI, a programmer or developer must modify the code, which may result in a new web application for the user. In some cases, a unique look and feel for each tenant may be possible without extensive coding. However, many tenants want different procedures grouped together, a different order in which procedures are performed, different navigation or flow through the web application, or other functional, rather than aesthetic, changes to the web application UI. Implementing the functional and navigational changes can be particularly expensive, leading to both greater hosting and greater programming costs. Thus, when the costs are prohibitive, tenants are often stuck with UI functionality that a developer has determined will best meet the needs of most potential tenants or clients.

Applicants have recognized a need for, and disclose herein, systems and methods for generating UIs for web applications without requiring hard coding for the UI modifications. The present application discloses systems, methods, and apparatuses for generating a web application UI based on metadata. According to one embodiment, a serving system includes a host component, a metadata interpreter, a rendering engine, and a response component. The host component is configured to receive, from a client, a request for at least a portion of a web application. The metadata interpreter is configured to retrieve metadata describing a UI of the web application. The rendering engine is configured to render an initial screen based on the metadata. The initial screen includes a screen for display by the client in relation to an activity of the web application. The response component is configured to send the metadata and the initial screen to the client.

According to another embodiment, a client system includes a request component, a receiver component, a display component, and a metadata interpreter. The request component is configured to send a request for at least a portion of a web application to a server. The receiver component is configured to receive a response to the request from the server. The response includes metadata describing a UI of the web application and UI assets for an initial screen. The display component is configured to display the initial screen on a display, and the metadata interpreter is configured to process the metadata to provide run-time operation for the web application.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail in order to avoid obscuring more important aspects of the disclosure.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or detailed description is for illustrative purposes only and is not meant to imply a required order, unless specified to require an order.

Embodiments may include various steps, which may be embodied in machine-executable instructions to be executed by a computer system. A computer system comprises one or more general-purpose or special-purpose computers (or other electronic devices). Alternatively, the computer system may comprise hardware components that include specific logic for performing the steps or comprise a combination of hardware, software, and/or firmware.

Embodiments may also be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may comprise a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or combination thereof.

The network may include communications or networking software, such as the software available from Novell, Microsoft, Artisoft, and other vendors, and may operate using TCP/IP, SPX, IPX, and other protocols through twisted pair, coaxial, or optical fiber cables; telephone lines; satellites; microwave relays; modulated AC power lines; physical media transfer; and/or other data transmission "wires" known to those of skill in the art. The network may encompass smaller networks and/or be connectable to other networks through a gateway or similar mechanism.

Each computer system includes at least a processor and a memory; computer systems may also include various input devices and/or output devices. The processor may include a general-purpose device, such as an Intel®, AMD®, or other "off-the-shelf" microprocessor. The processor may include a special-purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic memory, optical memory, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, RAM, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer executable code located within a memory device. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, different memory devices, or different computers, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as: general-purpose computers, computer programming tools and techniques, computer networks and networking technologies, digital storage media, authentication, access control, and other security tools and techniques provided by public keys, encryption, firewalls, and/or other means.

FIG. 1 is a schematic diagram illustrating a system 100 for providing a metadata driven UI. The system 100 includes a server system 102 and a client 104 which are in communication over a network 106. In one embodiment, the network 106 may include a plurality of networks including one or more of a local area network (LAN), a wide area network (WAN), the Internet, or another network or communication connection. In one embodiment, the system 100 may be used to provide a metadata driven UI for a web application where the behavior of the UI is generated based on the metadata.

The server system 102 may include a computing device or computing system that hosts a web application. The server system 102 may include a rack mounted server or other computing device, which may be accessed by one or more clients 104 over the network 106. For example, the server system 102 may be accessible over the Internet. In one embodiment, the server system 102 may require authorization before allowing access to a web application.

In one embodiment, the server system 102 stores information about a web application including programming code, metadata describing a UI of the web application, or the like. In one embodiment, the server system 102 stores code for a metadata interpreter that can interpret metadata to generate code, such as code that can be interpreted by a web browser. The server system 102 may also store code for a rendering engine that can render visual display elements, such as UI assets, for a display screen or other visual interface for the web application. The server system 102 may provide code, metadata, or the like corresponding to a web application to a client 104 in response to a request from the client 104 for the web application. In one embodiment, the server system 102 may render an initial screen of the web application to speed up display of the initial screen at the client 104.

The client 104 may include any type of computing device or system that can access the server system 102. For example, the client 104 may include a laptop computer, desktop computer, tablet computer, smartphone, netbook, or any other computing device which is capable of accessing a computer network. In one embodiment, the client 104 includes a browser for accessing websites and executing web applications. In one embodiment, the client 104 may receive the metadata, code, or other information corresponding to a web application from the server system 102 for execution within a browser of the client 104. In one embodiment, an instance of a metadata interpreter and/or a rendering engine may be located on the client 104 as well as the server system 102. A plurality of clients 104 may be able to connect to and access the server system 102.

Figure 2:
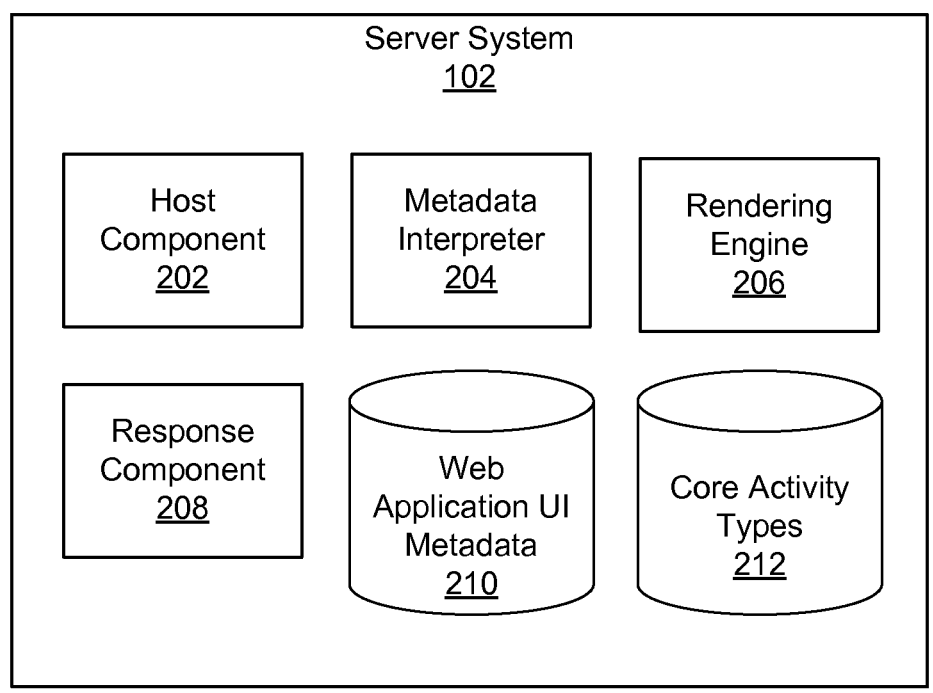
FIG. 2 is a schematic block diagram of a server system for providing a metadata driven UI, according to one embodiment.

FIG. 2 is a schematic block diagram of a server system 102 for providing a web application with a metadata driven UI. The server system 102 includes a host component 202, a metadata interpreter 204, a rendering engine 206, a response component 208, a web application UI metadata store 210, and a core activity types store 212. The components 202-212 are given by way of example and may not all be included in all embodiments.

The host component 202 is configured to receive, from a client, a request for at least a portion of a web application. For example, the host component 202 may receive a request in response to a user typing or selecting a universal resource locator (URL) corresponding to a web application hosted by the server system 102. The request may indicate a specific web application or function. The request may include information indicating an identity of a client 104 or user. For example, the request may indicate a tenant or entity to which the client 104 corresponds. In one embodiment, the host component 202 may determine whether the request is an initial request for the web application. For example, the host component 202 may determine that the request includes an initial request based on whether the client 104 is requesting the whole application, or only a resource or asset of the web application. In one embodiment, the request may indicate whether the request is an initial request or may indicate a current state of a web application at the client 104. For example, the request may indicate that the web application is currently in a specific state (e.g., processing a specific activity) at the client 104.

In one embodiment, the host component 202 may determine what portion of the web application to send to the client 104. For example, in response to a general request for the web application, the host component 202 may determine that the whole web application (and any associated metadata or code) should be sent to the client 104. In one embodiment, the request may indicate a specific activity or procedure of the web application that is being requested. In one embodiment, as will be discussed below, the host component 202 supports "deep linking," where a user can request a resource or activity that is associated with an activity within an activity hierarchy. For example, a local path of the URL for the user's request may represent an activity hierarchy that describes the user's position within the UI flow, or a desired starting point within the UI flow. The host component 202 may determine that some information corresponding to a root activity in the activity hierarchy will also be sent to the client 104 if it is needed for the requested activity (e.g., as indicated by the URL path to the corresponding child activity).

The metadata interpreter 204 is configured to retrieve and/or interpret metadata corresponding to a web application. In one embodiment, the metadata interpreter 204 retrieves metadata corresponding to a requested web application. For example, each web application may have corresponding metadata that describes a UI of the web application. The metadata includes data about data, or more specifically in one embodiment, declarative information about a UI of a requested web application. The metadata may include parameters or data in a required format. Example data formats for the metadata include a JavaScript Object Notation (JSON) format, an extensible markup language (XML) format, comma separated values (CSV) format, or other data or metadata format. In one embodiment, the metadata format does not include a format or code language that is readable by a browser. For example, the metadata may need to be retrieved and interpreted/converted in order to obtain code that can be executed by the client 104.

The metadata may be stored in and retrieved from the web application UI metadata store 210. In one embodiment, the metadata indicates run-time operations or an order for run-time operations for the web application, and the web application comprises a metadata driven run-time. For example, the metadata may be used during run-time to dynamically generate screens, determine which procedures should be performed next, or the like. In one embodiment, the web application includes a dynamically generated UI, wherein the UI interface is generated based on the metadata. In one embodiment, the metadata defines allowed navigation within the UI of the web application. For example, the metadata may indicate a next procedure to be performed and/or what input from a user is needed for a procedure.

In one embodiment, the metadata interpreter 204 may retrieve metadata specific to a client 104. For example, the request from the client 104 may indicate a corresponding tenant and the metadata interpreter 204 may check to see if there is any custom metadata for the tenant. In some embodiments, workflows and activity configurations can be modified on a per-tenant basis to provide custom UI appearances and behaviors for each tenant. The modifications may be stored by the server system 102 as separate metadata within the web application UI metadata store 210. Once relevant UI metadata has been identified by the metadata interpreter 204, any modifications specific to the tenant may be applied to the default UI metadata before it is processed. Modifying default metadata with client-specific metadata may allow an entire UI for a web application to be changed on a per-tenant basis without redeploying or restarting the web application. The combined or modified metadata may then be provided by the response component 208 to the client 104, or may be provided to a browser or rendering engine 206 for generation of the UI.

The metadata interpreter 204 may interpret the metadata to generate code or information that can be used by the rendering engine 206 to generate a visual screen to a browser to control operation of a web application, or UI of a web application. In one embodiment, the metadata includes information indicating one or more activities or activity types within the web application. As used herein, the term activity is given to mean metadata that represents discrete parts of a web application, such as a web application's UI. For instance, an activity may be used to represent a form that receives input from a user, a chart or graph, a call to a service, an operation to present a list of records to be viewed/edited, an operation to perform Boolean logic, or other operations. Each activity corresponds to an activity type. An activity type is tied to a class or module that is responsible for executing the activities of that type. Activities are also composable in that each activity can contain child activities. For example, an activity of any type may include or reference an activity of any other type.

In one embodiment, information about core activity types may be included in the core activity types store 212. In one embodiment, several built-in activity types that can be used by any web application may be built with the system and stored by the core activity types store 212. Some example activity types, which may be included as core activity types, include a workflow activity type, a step activity type, a list activity type, a "compose" activity type, an "if" activity type, an application activity type, a modal activity type, and a guard activity type. This list is given by way of example only and may be modified significantly in different embodiments.

The workflow activity type is an activity that is used for sequential flow control. A workflow may include a plurality of step activity types. Each step activity type may include a logical grouping of activities within the workflow. Step activities are useful for displaying a user's progress within a workflow. Each step activity is made up of one or more activities. In one embodiment, at least one activity in a step activity has a visual component, by convention, and can thereby represent a discrete point in the UI navigation flow. For example, a request may indicate any specific step activity of the workflow to which a client 104 wishes to jump in a web application.

A list activity type is an activity that presents a list of records to a user and allows the user to edit the records. For example, a visual list may be presented on a screen and a user may provide input to modify an entry in the list, delete an entry, add an entry, reorder the list, or the like.

A compose activity type allows a user or developer to create an activity that is a composite of multiple activities. In one embodiment, the compose activity's configuration specifies a main activity, a "before" property that includes a list of one or more activities to be executed before the main activity, and/or an "after" property that contains a list of one or more activities to be executed after the main activity. The compose activity allows arbitrary before and after operations to be bundled with an activity that has a visual component, such as a form activity. In one embodiment, the main activity may be required to include a visual component, and the activities listed in the before and after sections may be restricted from having visual components.

An if activity type allows a user to create branching logic. In one embodiment, an if activity's configuration specifies an expression, a "then" activity, and, optionally, an "else" activity. When evaluated, the expression produces a Boolean value (e.g., true or false). When the if activity is executed, the expression is evaluated. If the expression evaluates to a value of Boolean true, the then activity is executed. If the expression evaluates to a value of Boolean false, the else activity is executed, if one was specified.

An application activity type may be used for non-sequential flow control. An example of an application activity is a tabular layout, where each activity listed in the application activity's configuration corresponds to a visual tab component. When a user selects the visual component, a child activity corresponding to the tab may be executed. Note that an application activity is not the same thing as a web application, which refers to the overarching application that can utilize the metadata driven UI framework to implement its UI.

A modal activity type can be used to execute a single child activity and render it in a modal dialog box. Since activities can contain arbitrary child activity hierarchies, the modal activity can be used to modally present complex UI components.

A guard activity contains activities that cannot be moved past. For example, a guard activity type can contain a non-visual activity that checks to see whether information needed from a user has been received. For example, a form activity that collects data input from a user may be followed by a guard activity. After a user selects a next option on the form activity, the guard activity may execute to determine whether all required information has been provided. If the guard activity determines that all required information has been entered, the guard activity may allow the client 104 to continue to the next activity in the web application. If the guard activity determines that some required information has not been provided, the guard activity may block forward navigation and provide an indication on the form as to what fields need to be filled in or options need to be selected.

A form activity type may define a visual form for presentation to a user. The form activity's configuration may indicate one or more fields where a user can provide input. Example fields include check boxes, radio buttons, drop-down lists, text fields, or the like. In one embodiment, activities can be used as field-types. For example, a field may correspond to another activity. The form activity may be used to accept input from the user for usage by the web application or for storage.

As mentioned, the above activity types are given by way of example only. Specific applications may each have a plurality of activities having other activity types which provide desired functionality and operations within the application. In addition to core or built-in activity types, users or developers are permitted to extend activities or create custom activity types. For example, web application developers can create their own custom activity types. A custom activity type may be entirely new or may extend a pre-existing activity type. In one embodiment, developers may create extensions that are applied to pre-existing activity types. This enables developers to customize the behavior of stock activity types without modifying underlying code. In one embodiment, extending an existing activity type is accomplished by defining new metadata and code that are used to override the behavior of the extended activity type. In one embodiment, the extended or custom activity types may be stored specifically to the tenant. For example, if a new activity type is created in relation to a tenant, the new activity type, and any corresponding code, can be stored separately so that it is only used in relation to the specific tenant.

In one embodiment, each activity references an activity type. In one embodiment, an activity type is a module that contains the code to be executed by a system to perform an activity of that type. An activity type can expose one or more input properties that can be used to modify the behavior of the activity type's code. The values that an activity provides to these input properties are referred to collectively as the activity's configuration. An activity's configuration is part of the activity metadata. In one embodiment, the metadata may reference data as input for the activity without explicitly including it as part of the metadata. An activity type can define a default configuration that will be used in the event that an activity (e.g., metadata) of that type does not define its own configuration.

Each activity represents an operation that should be performed by the system. Often, activities include visual components that instruct the system to generate UI assets and submit them to the browser. However, activities can represent operations that do not have visual components, such as calling a service and storing the response.

A user's navigation through the UI is referred to as flow. In one embodiment, the metadata controls the user's flow through the system by determining which activities to execute in response to UI events. Certain activity types are designed specifically to control the user's flow through the UI. Some examples of these flow-control activities are workflow activities, application activities, list activities, modal activities, and guard activities. When the user triggers a UI event that requires navigation, the active flow control activity will determine which activity to execute next. For instance, if a given UI is defined as a workflow activity with a sequence of child form activities, it will execute the first form activity in the sequence, which in turn will present a visual representation of the form to the user. If the user triggers a UI event to submit the form, then once the form has been processed, the first form activity will signal that its execution is complete. At this point, the workflow activity may execute the second form activity in the sequence, and so on.

An activity also may have one or more actions that are triggered in response to UI events but do not constitute UI navigation. In one embodiment, an activity type can define a default action, but an activity's action can be overridden. An activity's action can be to execute another activity.

In one embodiment, each activity that has a visual component (such as a form activity) represents a discrete point in the UI flow. Activities that do not have visual components are executed, but may not halt navigation. For instance, assume a given UI is defined as a workflow activity with two child activities: a form activity, and a compose activity that is configured to execute a before service activity and then execute a main form activity. In one embodiment, when the workflow activity is first executed, it will execute the child form activity, which in turn will present a visual representation of the form to the user and halt the navigation operation. If the user triggers a UI event to submit the form, then once the form has been processed, the first form activity will signal that its execution is complete. At this point, the workflow activity will execute the child compose activity. The compose activity will first execute the before service activity. Since the service activity does not have a visual component, its execution will not halt the navigation operation. The compose activity will then execute the main form activity, which in turn will present a visual representation of the form to the user and halt the navigation operation.

As will be understood based on the present disclosure, the metadata and activities may create a hierarchy of activities that control a UI and operation of the web application. For example, a root hierarchy may correspond to a starting interface or screen of a web application and sub-activities may form a branching hierarchy where some activities are subordinate to other activities. In one embodiment, the flexibility in combining activities allows for complex variations on a web application's UI, simply based on metadata. Thus, a user can define complex UI navigation and flow without modifying or creating code.

Figure 4:
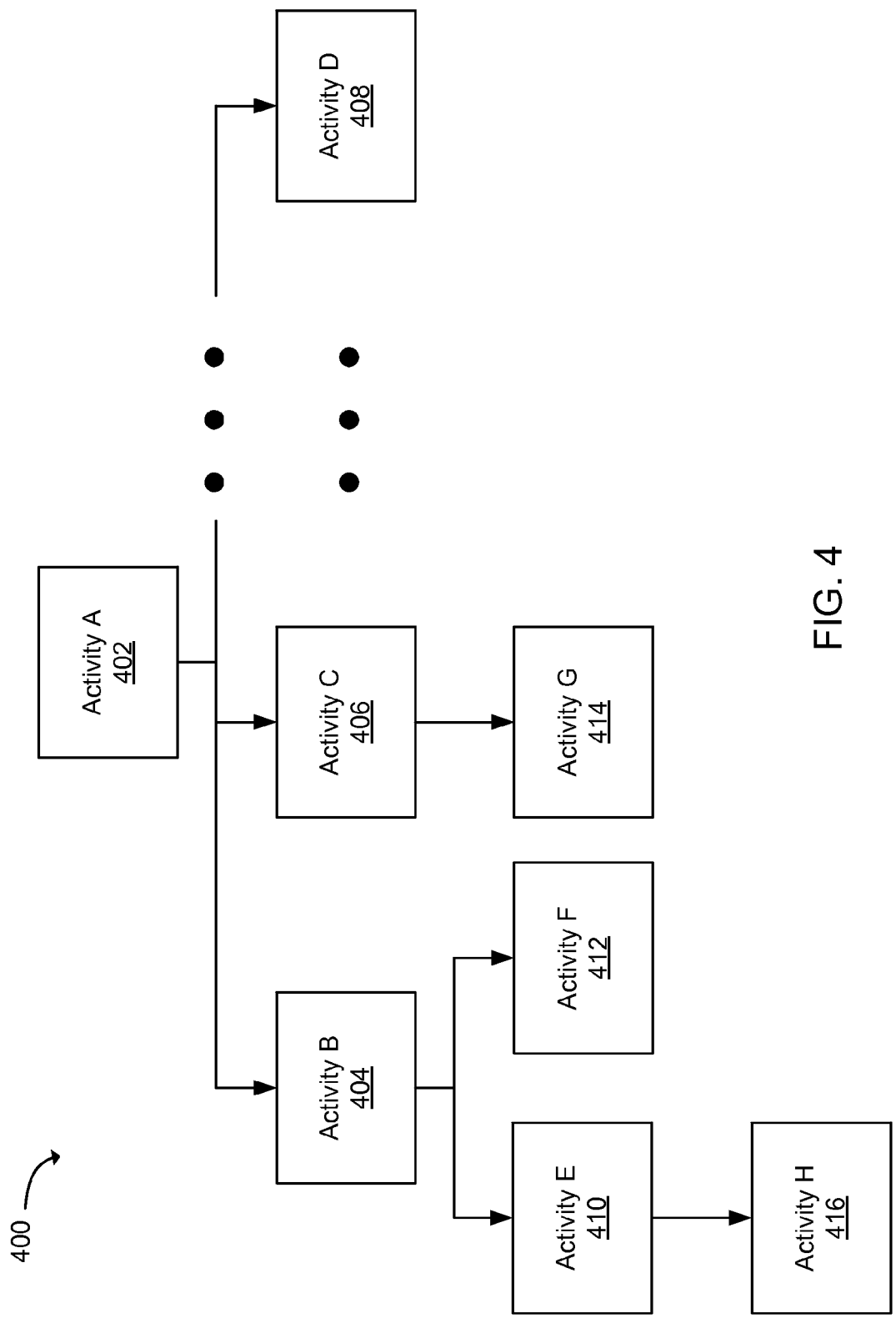
FIG. 4 is a block diagram illustrating an activity hierarchy, according to one embodiment.

FIG. 4 illustrates an example activity hierarchy 400 for a web application UI. The hierarchy 400 includes a plurality of visual activities 404-416 which may be performed during the web application. The hierarchy 400 may be defined by metadata. The hierarchy 400 includes a root activity, activity A 402, and child activities, which include activity B 404, activity C 406, and activity D 408. In one embodiment, the metadata may define configurations for activity A 402 including configuration information indicating that activity B 404, activity C 406, and activity D 408 are child activities of activity A 402. The metadata configuration for activity B 404 may define child activities as activity E 410 and activity F 412. Similarly, the metadata configuration for activity E 410 may define child activity H 416, and the metadata configuration for activity C 406 may define child activity G 414. Thus, the metadata may allow a user to specify a hierarchy, including a UI navigation or flow, based on metadata. For example, one tenant may desire that activity G be performed as a child activity of activity H and can specify metadata to make this change. Thus, the tenant can get the desired customized UI while other tenants will not see the change.

Returning to FIG. 2, the metadata interpreter 204 may interpret the metadata by retrieving code corresponding to the metadata. For example, the metadata interpreter 204 may retrieve code corresponding to an activity type. The metadata interpreter 204 may provide the code, and any parameters defined in the metadata for the activity (i.e., an activities configuration), to a browser or rendering engine 206 for processing or execution. In one embodiment, the metadata interpreter 204 may obtain code for the current activity as indicated by a default activity type, modifying metadata for modifying the default activity type, and/or custom activity types. For example, default metadata may be combined with tenant-specific metadata before determining what code should be retrieved for an activity.

According to one embodiment, each activity specified by metadata may include two phases during operation of a web application: a setup phase and a run-time phase. The setup phase may include the metadata interpreter 204 retrieving metadata, obtaining code corresponding to the metadata, and obtaining inputs for the code, while the run-time phase may include the execution of the code based on any inputs. In one embodiment, the metadata interpreter 204 may process the metadata on an activity-by-activity basis. For example, the metadata interpreter 204 may only retrieve code for a current activity or for up to a predetermined number of activities following the current activity. The retrieved code may be provided to a rendering engine or the web application for display/execution. For example, when in the server system 102, the retrieved code may be provided to the rendering engine 206 but may not be rendered on a display of the server system 102.

The rendering engine 206 is configured to convert metadata and/or other information retrieved by the metadata interpreter 204 to UI assets for display as part of a screen of the UI interface. The UI assets may include information or code which can be interpreted by a browser. The UI assets generated by the rendering engine 206 may include markup, such as text or symbols in compliance with a hypertext markup language (HTML) protocol. The UI assets may also include code which can be interpreted by the browser, such as JavaScript. The UI assets may include resource files or references to resource files such as image files, text files, video files, audio files, or other files for displaying as part of a web page or interface.

In order to render the UI, the system interprets the UI metadata and dynamically generates the necessary UI assets (e.g., markup, code, and references to resource files) and submits them to the user's browser for processing. In one embodiment, the rendering engine 206 renders a screen based on metadata or code retrieved by the metadata interpreter 204.

According to one embodiment, instances of the rendering engine 206 run both on a server system 102 and in a web browser of a client 104. When the user submits a first request to the host's server, the rendering engine 206 running on the host's server performs the rendering of the initial screen. The generated UI assets are then sent to the user's browser, along with the UI metadata for the application, in response to the user's request. In some cases, no further communication with the host's server is necessary. The rendering engine 206 running within the client's browser may render the UI metadata for any remaining screens and submit the generated UI assets to the browser. The initial screen is rendered on the server so that the user is presented with viewable content as soon as the browser has finished processing the response. If the initial screen were not rendered at the browser, the user may be presented with a blank screen until the client-side rendering engine processed the UI metadata for the initial screen. The initial screen may thus be displayed more quickly because the client 104 does not need to wait for the metadata interpreter 204 and/or rendering engine 206 to generate UI assets for a screen. In one embodiment, the rendering engine 206 of the server system 102 renders the initial screen in response to the host component 202 determining that the request is an initial request for the web application. In one embodiment, other screens can be rendered at the client 104.

In one embodiment, the initial screen is a combination of all activities that will have a part in the initial visual presentation. For instance, if the activity configuration for the first activity is a workflow activity that defines a sequence of several form activities, the initial screen will include the workflow housing (controls, titles, text), along with the visual representation of the first form activity in the sequence.

In one embodiment, each activity configuration (as defined in the metadata) indicates what visual component(s) it will present to the user. In one embodiment, an activity's visual representation for its current state is determined by recursively navigating the activity's child activity hierarchy and building a visual context for the full activity tree. The resulting visual context may then be rendered to create UI assets that are submitted to the browser. For example, the rendering engine 206 may be configured to render a screen of the UI by recursively evaluating an activity and any child activities to build a visual context for the screen and displaying the screen in response to completion of building the visual context.

This technique of building a visual context recursively and rendering it once is generally faster than rendering each child activity recursively, because the browser's document object model (DOM) is only updated once. If the child activities were rendered individually, it would trigger multiple updates to the browser's DOM, which would significantly slow down the rendering. The rendering engine 206 is configured to render the initial screen by generating UI assets corresponding to the initial screen for display by the client.

The response component 208 is configured to send to the client 104 a response including metadata corresponding to a requested web application. In one embodiment, the response component 208 sends information to the client 104 as determined by the host component 202. For example, the response may include metadata for the whole web application. In one embodiment, the response may include the initial screen as rendered by the rendering engine 206. For example, if the response is sent in response to an initial request for the web application, the response may include the UI assets for the initial screen. According to one embodiment, the typical case is that all UI metadata for an application is sent to the client 104 from the host's server in response to the initial request. However, it is also possible to send subsequent requests to the host's server (or a third party server) for additional UI metadata following the initial request.

Figure 3:
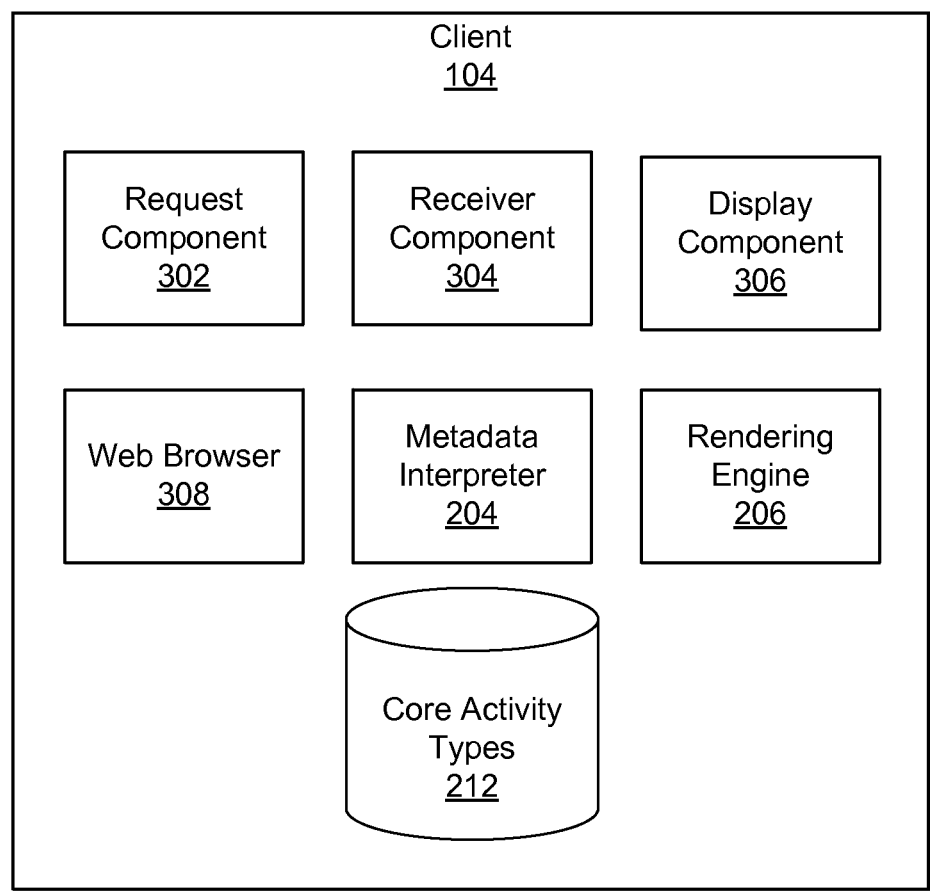
FIG. 3 is a schematic block diagram of a client for providing a metadata driven UI, according to one embodiment.

FIG. 3 is a schematic block diagram of a client 104. The client 104 includes a request component 302, a receiver component 304, a display component 306, and a web browser 308. The client 104 also includes a metadata interpreter 204, a rendering engine 206, and a core activity types store 212. In one embodiment, the metadata interpreter 204, rendering engine 206, and core activity types store 112 are provided by the server system 102 to run on the client 104, such as within the web browser 308 of the client 104.

The request component 302 is configured to send a request for at least a portion of a web application. The request component 302 may send the request in response to a user selecting a link, entering a URL, or otherwise providing input to run a web application hosted by a server system 102. The request may include the URL corresponding to the web application. The request may indicate a specific web application or function. The request may include information indicating an identity of the client 104 or user. For example, the request may indicate a tenant or entity to which the client 104 corresponds. The request component 302 may send a request that includes an indication that the request is an initial request. In one embodiment, the request component 302 may indicate a current state of the web application, if it is already running on the client 104.

In one embodiment, the system supports deep linking where a user can request a resource that is associated with an activity within an activity hierarchy. For example, a client 104 can request an activity other than the root activity. With reference to FIG. 4, deep linking may include requesting activity B 404, or any other activity within the activity hierarchy 400 other than the root activity, activity A 402. In one embodiment, the local path of the URL for the user's request represents a specific activity within the activity hierarchy 400 that describes the user's position within the UI flow of the web application. In one embodiment, if a non-root activity is requested, a root activity (or other activity in the activity hierarchy) will pass down the relative parts of the URL path to the corresponding child activity. The child activity will use the relative path to determine its visual representation and then repeat the process with its child activities, and so on. This deep linking allows any activity of a workflow or web application to be an entry point for system behavior. For example, the workflow activity itself is an activity type. Characterizing workflows as an activity type may provide easier integration with legacy systems, which may depend on workflows.

In some embodiments, the request component 302 may send a request subsequent to an initial request. For example, the request component 302 may send requests to a server system 102 (or a third party server) for additional UI metadata.

The receiver component 304 is configured to receive a response from a server system 102 corresponding to a requested web application. The response may include any of the information discussed above in relation to the server system 102. The response may include metadata for the whole web application. In one embodiment, the response may include the initial screen as rendered by the rendering engine 206 at the server system 102. For example, if the response is sent in response to an initial request for the web application, the response may include the UI assets for the initial screen. In one embodiment, the response may include the metadata interpreter 204, the rendering engine 206, and/or the core activity types store 212.

The display component 306 is configured to display one or more visual components of the UI. In one embodiment, the display component 306 displays a screen as rendered by a rendering engine 206 in a browser window. For example, the display component 306 may display the initial screen received in the response from the server system 102. In one embodiment, the display component 306 may display a screen as rendered by the rendering engine 206 of the client 104. In one embodiment, the display component 306 includes a physical display of the client 104.

The web browser 308 may include an application or component that is configured to access files and websites based on a networking protocol. For example, the web browser 308 may be configured to browse and access websites and files based on one or more of a communication protocol, markup language, file type, or the like used in web applications, websites, or the like. Example browsers include mobile or desktop versions of Internet Explorer®, Safari®, Mozilla Firefox®, Google Chrome®, and the like.

The metadata interpreter 204 may include a metadata interpreter as described in relation to FIG. 2. For example, the metadata interpreter 204 on the client 104 may include another instance of the metadata interpreter 204 on the server system 102. In one embodiment, the metadata interpreter 204 may be used to interpret metadata at the client 104 to generate UI for the web application, control navigation, or the like.

The rendering engine 206 may include a rendering engine as described in relation to FIG. 2. For example, the rendering engine 206 on the client 104 may include another instance of the rendering engine 206 on the server system 102. In one embodiment, the rendering engine 206 may be used to render any screens which are not rendered at the server system 102. For example, the rendering engine 206 may not be used to render an initial image if this has been rendered by the server system 102. Images subsequent to an initial image may be rendered by the rendering engine 206 local to the client 104.

The client 104 may also include a core activity types store 212 for storing information about core or built-in activity types. For example, the core activity types store 212 may include code corresponding to activity types or activities configured by metadata.

Based on the teaching disclosed herein, and with the metadata interpreter 204, rendering engine 206, and core activity types store 212 located at the client 104, the client 104 can interpret metadata to dynamically generate a UI for a corresponding web application. Thus, the client 104 can use metadata to define UI layout and content as well as UI behavior and navigation. Furthermore, developers and users can extend and customize a UI by editing and extending the UI metadata. The invention can apply UI changes automatically without redeploying or restarting the application server(s). Furthermore, changes made in relation to a specific tenant can be isolated so that these UI changes only affect the experience of a certain group of end-users, such as users corresponding to the tenant.

Figure 5:
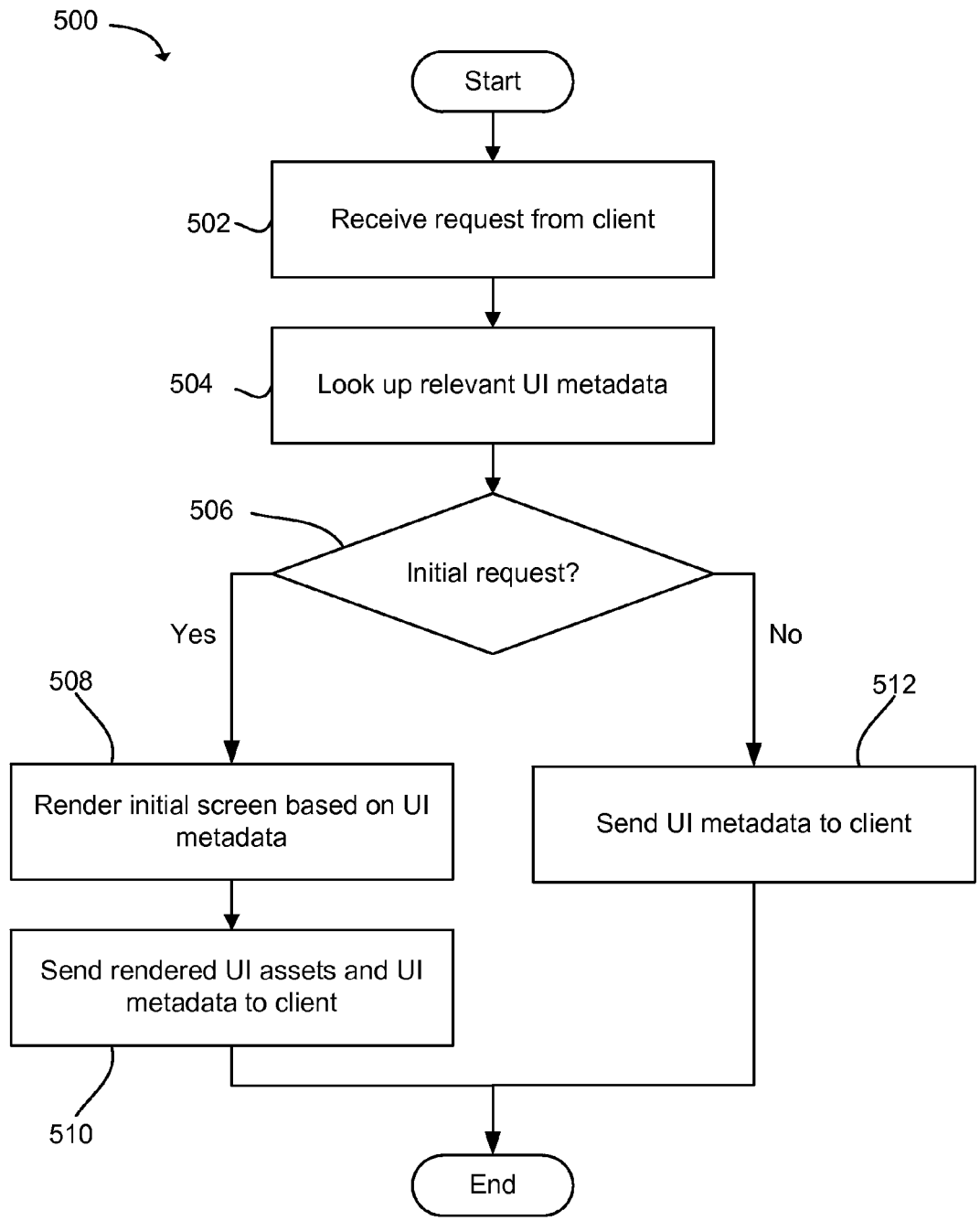
FIG. 5 is a flow chart of a method for providing a metadata driven UI, according to one embodiment.

FIG. 5 is a schematic flow chart diagram illustrating a method 500 for providing a metadata driven UI for a web application. In one embodiment, the method 500 is performed by the server system 102 of FIG. 2.

The method 500 begins and a host component 202 receives 502 a request from a client 104. The request may indicate a request for at least a portion of a web application hosted by a server system 102. A metadata interpreter 204 looks up 504 UI metadata relevant to the requested web application. For example, the metadata interpreter 204 may retrieve metadata corresponding to a default activity of the web application. In one embodiment, the metadata interpreter 204 may retrieve metadata specific to a tenant. The metadata interpreter 204 may modify the default metadata based on the tenant-specific metadata.

The host component 202 determines 506 whether the request received 502 from the client 104 includes an initial request. If the request is an initial request (Yes at 506), a rendering engine 206 renders 508 an initial screen based on the metadata looked up 504 by the metadata interpreter 204. The response component 208 sends 510 a response to the client 104 including any UI assets rendered 508 by the rendering engine 206 and UI metadata retrieved by the metadata interpreter 204, and the method 500 ends. If the request is not an initial request (No at 506), the response component 208 sends 512 UI metadata retrieved by the metadata interpreter 204, and the method 500 ends. In one embodiment, the response component 208 may send a response that includes a state component for the web application. For example, the state may indicate whether an initial screen has already been rendered. The state may allow the client 104 to pick up where the server system 102 left off without re-rendering the initial screen.

Figure 6:
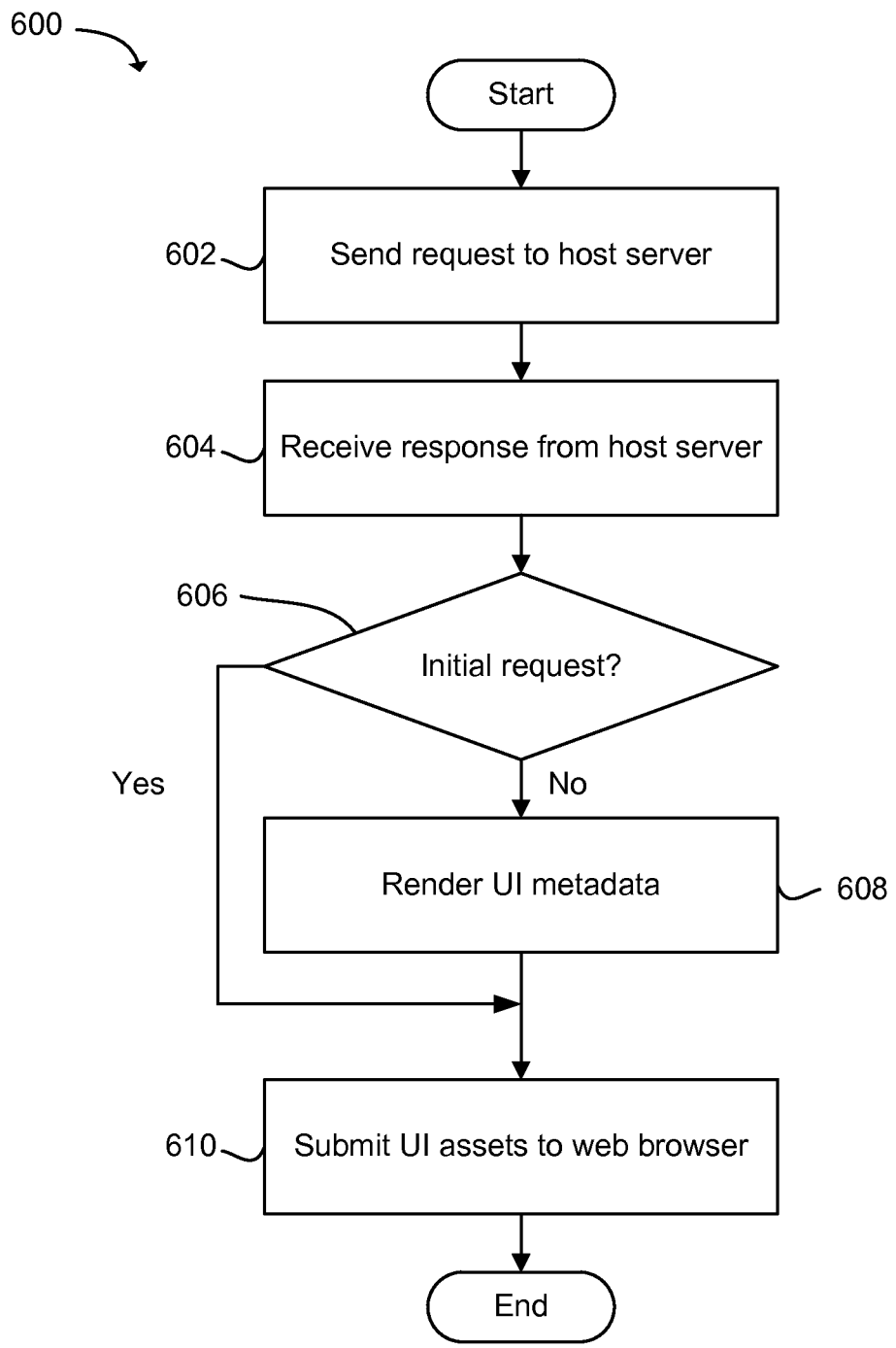
FIG. 6 is a flow chart of another method for providing a metadata driven UI, according to one embodiment.

FIG. 6 is a schematic flow chart diagram illustrating a method 600 for providing a metadata driven UI for a web application. In one embodiment, the method 600 is performed by the client 104 of FIG. 3. In one embodiment, the client 104 may perform the method 600 in conjunction with the server system 102 performing the method 500 of FIG. 5.

The method 600 begins and the request component 302 sends 602 a request for at least a portion of a web application to a server system 102. The receiver component 304 receives 604 a response to the request (such as the response sent 510 or 512 during method 500). The response may include UI metadata for the web application and/or UI assets for an initial screen. The UI assets may include assets rendered by a rendering engine 204 on the server system 102.

The receiver component 304 determines 606 whether the request sent 602 by the request component 302 is an initial request. For example, the receiver component 304 may determine 606 whether the response received 604 by the receiver component 304 includes UI assets for an initial screen. As another example, the receiver component 304 may determine whether the request was an initial request based on state information in the response. For example, the client 104 may continue executing the web application based on the state information indicated in the response.

If the request is not an initial request (No at 606), the rendering engine 206 renders 608 an initial screen (e.g., visually renders the UI metadata) and submits 610 UI assets for the rendered initial screen to a web browser 308 for display, and the method 600 ends. If the request is an initial request (Yes at 606), the rendering engine 206 submits 610 UI assets received 604 in the response to the web browser 308 for display, and the method 600 ends.

It will be obvious to those having skill in the art that many changes may be made to the details of the above-described embodiments without departing from the underlying principles of the disclosure. The scope of the present disclosure should, therefore, be determined only by the following claims.

The invention claimed is:

1. A system comprising:
a host component, on a computing device, comprising one or more processing resources and memory, configured to receive, from a client, a request for at least a portion of a web application;
a metadata interpreter, on the computing device, configured to retrieve metadata comprising a user interface of the web application, a plurality of hierarchies of activities, and a navigation between the plurality of hierarchies of activities corresponding to a plurality of screens of the web application,
wherein the plurality of hierarchies of activities control the user interface of the web application;
a rendering engine, on the computing device, configured to render an initial screen based on the metadata, the initial screen for display by the client in relation to an activity of the web application; and
a response component, on the computing device, configured to send the metadata and the initial screen to the client, wherein the metadata is renderable to generate the plurality of screens of the web application.

2. The system of claim 1, wherein the host component is further configured to determine whether the request comprises an initial request, and wherein the rendering engine is configured to render the initial screen by rendering in response to determining that the request comprises the initial request.

3. The system of claim 1, wherein the web application comprises a metadata driven run-time and wherein the metadata interpreter retrieves the metadata associated with the web application comprising metadata indicating run-time operations for the web application.

4. The system of claim 1, wherein the web application comprises a dynamically generated user interface, wherein the user interface is generated based on the metadata.

5. The system of claim 1, wherein the rendering engine is configured to render the initial screen by generating user interface assets corresponding to the initial screen for display by the client.

6. The system of claim 1, wherein the metadata defines navigation within the user interface of the web application.

7. The system of claim 1, wherein the response component is configured to send the metadata comprising all metadata corresponding to the web application in response to the request.

8. The system of claim 1, wherein the metadata interpreter retrieves metadata corresponding to one or more activity types and retrieves metadata specific to a tenant corresponding to the client.

9. A system comprising:
a request component, on a computing device, comprising one or more processing resources and memory, configured to send a request for at least a portion of a web application to a server;
a receiver component, on the computing device, configured to receive a response to the request from the server, wherein the response comprises metadata comprising a user interface of the web application, a plurality of hierarchies of activities, a navigation between the plurality of hierarchies of activities corresponding to a plurality of screens of the web application, and user interface assets for an initial screen,
wherein the hierarchy of activities controls the user interface of the web application;
a display component, on the computing device, configured to display the initial screen on a display; and
a metadata interpreter, on the computing device, configured to:
process the metadata to generate code that is interpreted by a web browser; and
process, by a web browser, the code to provide run-time operation for the web application, wherein the metadata is renderable to generate the plurality of screens of the web application.

10. The system of claim 9, wherein the metadata indicates one or more activity types for an activity of the web application, wherein the activity indicates one or more procedures to be performed.

11. The system of claim 10, wherein the metadata comprises metadata corresponding to the one or more activity types and metadata specific to a tenant.

12. The system of claim 11, wherein the one or more activity types comprise a custom activity type, wherein the custom activity type is defined specific to the tenant.

13. The system of claim 11, further comprising a metadata interpreter configured to retrieve code for executing one or more activities having the one or more activity types.

14. The system of claim 10, wherein the metadata further indicates a hierarchy for the activity and one or more additional activities having the one or more activity types.

15. The system of claim 14, further comprising a rendering engine configured to render a screen of the user interface by:
recursively evaluating an activity and any child activities to build a visual context for the screen; and
displaying the screen in response to completion of building the visual context.

16. The system of claim 14, wherein the request indicates a requested activity within the web application, wherein the activity comprises an activity at a level below a root activity within the hierarchy for the activities.

17. The system of claim 16, wherein the initial screen in the response comprises a screen corresponding to the requested activity.

18. A non-transitory computer-readable storage medium having stored thereon computer-readable instruction code for a computer system to perform a method, the method comprising:
sending a request for at least a portion of a web application to a server;
receiving a response to the request from the server, wherein the response comprises metadata comprising a user interface of the web application, a plurality of hierarchies of activities, a navigation between the plurality of hierarchies of activities corresponding to a plurality of screens of the web application, and user interface assets for an initial screen,
wherein the hierarchy of activities controls the user interface of the web application;
displaying the initial screen on a display;
processing the metadata to generate code that is interpreted by a web browser; and
process, by a web browser, the code to provide run-time operation for the web application, wherein the metadata is renderable to generate the plurality of screens of the web application.

19. The non-transitory computer-readable storage medium of claim 18, wherein the method further comprises rendering one or more subsequent screens based on the metadata.

20. The non-transitory computer-readable storage medium of claim 18, wherein the metadata indicates one or more activity types for two or more activities of the web application and a hierarchy for the one or more activities, and wherein the request indicates a requested activity within the web application, wherein the activity comprises an activity at a level below a root activity within a hierarchy for the activities.

* * * * *